METHOD FOR FORMING AN IMAGE IN A MAGNETIZABLE INK LAYER

Filed Jan. 29, 1965 9 Sheets-Sheet 1

INVENTOR.
HELMUT KÄUFER
ERICH BURGER
HANS-PETER HUBER
BY
Michael J. Striker
Atty

METHOD FOR FORMING AN IMAGE IN A MAGNETIZABLE INK LAYER

Filed Jan. 29, 1965 9 Sheets-Sheet 2

INVENTOR.

BY HELMUT KÄUFER
ERICH BURGER
HANS-PETER HUBER

METHOD FOR FORMING AN IMAGE IN A MAGNETIZABLE INK LAYER

INVENTOR.
HELMUT KÄUFER
ERICH BURGER
HANS-PETER HUBER
BY

METHOD FOR FORMING AN IMAGE IN A MAGNETIZABLE INK LAYER

INVENTOR.

BY HELMUT KÄUFER
ERICH BURGER
HANS-PETER HUBER

Oct. 14, 1969 H. KÄUFER ET AL 3,472,695

METHOD FOR FORMING AN IMAGE IN A MAGNETIZABLE INK LAYER

Filed Jan. 29, 1965 9 Sheets-Sheet 5

INVENTOR.

BY HELMUT KÄUFER
ERICH BURGER
HANS-PETER HUBER

METHOD FOR FORMING AN IMAGE IN A MAGNETIZABLE INK LAYER

INVENTOR.

BY HELMUT KÄUFER
ERICH BURGER
HANS-PETER HUBER

INVENTOR.
HELMUT KÄUFER
ERICH BURGER
HANS-PETER HUBER
BY

*INVENTOR.*

HELMUT KÄUFER
ERICH BURGER
HANS-PETER HUBER

*BY*

METHOD FOR FORMING AN IMAGE IN A MAGNETIZABLE INK LAYER

Filed Jan. 29, 1965 9 Sheets-Sheet 9

INVENTOR.

BY HELMUT KÄUFER
ERICH BURGER
HANS-PETER HUBER 3,472,695

METHOD FOR FORMING AN IMAGE IN A MAGNETIZABLE INK LAYER

Helmut Käufer, Erich Burger, and Hans-Peter Huber, Munich, Germany, assignors to Agfa Aktiengesellschaft, Leverkusen, Germany Filed Jan. 29, 1965, Ser. No. 428,964
Claims priority, application Germany, Feb. 6, 1964, A 45,160
Int. Cl. B05b *5/02;* G03g *15/14*
U.S. Cl. 117—238 8 Claims

ABSTRACT OF THE DISCLOSURE

A method of preparing a latent image by forming a surface of magnetizable material, the degree of permeability of which depends upon the extent of heating of the material followed by selectively heating the surface of magnetizable material so as to create within such surface portions of different permeability corresponding to the selective heating of such portions, whereby a selective pattern of surface portions of a predetermined permeability range is obtained which corresponds to the selective heating of the surface.

The present invention relates to a method and apparatus for forming an image and, more particularly, the present invention is concerned with forming a visible image with the help of a magnetizable material, by heating the magnetizable material in a pattern corresponding to the image to be formed and by utilizing the variation of a magnetic property of the magnetizable material as a function of the temperature for producing a latent magnet image.

Several methods have been proposed for making latent magnet images visible and for magnetically transferring the same onto a suitable image carrier. Such magnet printing processes are easy to carry out because the printing process itself as well as the possibly required cleaning steps can be carried out with the help of suitable magnetic fields without direct contact, whereby the intensity of the magnet fields can be easily controlled. When a gradated latent magnet image has been produced or is available, it is even possible to produce half-tone prints thereof.

However, up to now, these advantages were connected with the disadvantage that the latent magnet image could be produced only in a relatively involved and difficult manner. According to the known methods, for instance, the latent magnetic image is produced by pointwise magnetizing a remanently magnetizable layer, whereby the energizing current of the electromagnet is controlled through a photocell amplifier which scans an image which is to be reproduced. In another device which may be used for rapid printout in connection with electronic data processing apparatus, a matrix which is formed of small magnet coils is activated corresponding to the image so as to form a magnetic replica thereof. Another method of the prior art proposes the forming of a magnetic printing form by application of a highly permeable material in accordance with the pattern of the image to be produced.

Whenever in the present specification and claims reference is made to permeability, this is to denote magnetic permeability.

It has also been attempted to produce a latent magnetic image by heating a portion of a premagnetized layer of magnetic materail, which portion corresponds to the image which is to be reproduced, above the Curie point of the material. Thereby, however, the useful range of temperatures is extremely limited by the coercive forces. Even when using the most favorable magnet material which presently is available for this process, such as ferromagnetic chromium oxides, it will be found that for Curie points in the temperature range which is suitable for the forming of an image or an image copy by application of heat, the coercive force drops to the lower limit of the value which is suitable for magnetic image formation and copying. Even at the upper limit of the temperature range which is suitable for the heat copying method, the coercive forces which can be brought to play suffice only for the selective attraction of very easily movable pigment particles which are located at a very small distance from the magnetic layer.

It is therefore an object of the present invention to overcome the above discussed difficulties and disadvantages.

It is another object of the present invention to provide a method and device for forming an image or an image copy by utilizing the temperature dependency of the magnetic permeability of a magnetizable material, which method can be carried out in a simple and economical manner and requires only relatively simple and easily operable apparatus.

It is thus a further object of the present invention to provide an improved method and apparatus for effecting magnetic printing by utilizing the temperature dependency of the permeability of magnetizable materials.

Other objects and advantages of the present invention will become apparent from a further reading of the description and of the appended claims.

With the above and other objects in view, the present invention contemplates in a method of preparing a latent image which comprises the steps of forming a surface of magnetizable material, the degree of permeability of which depends upon the extent of heating of said material, the steps of selectively heating the surface of magietizable material so as to create within the surface of magnetizable material portions of different permeability corresponding to the selective heating of the portions, whereby a selective patern of surface portions of a predetermined permeability range is obtained which corresponds to the selective heating of the surface.

The present invention also encompasses in a device for forming a copy of an image by utilizing the temperature dependency of the magnetic permeability of a magnetizable material, in combination, means for forming a surface of magnetizable material, the permeability of which depends upon the heating of the material, means for selectively heating the surface according to a predetermined pattern so as to form within the surface a selective pattern of surface portions within a predetermined range of permeability corresponding to the selective pattern of heating of the surface, and means for forming from the selective pattern of surface portions within the predetermined permeability a permanent reproduction having the same pattern.

Thus, according to the present invention, the magnetic image is produced with the help of variations of the permeability as a function of the temperature. A transitory, latent magnetic image is formed which is suitable for use in magnetic duplication processes as well as for carrying out a very effective printing process. For this purpose magnetizable materials are available in all temperature ranges including also the range of elevated temperatures directly adjacent to ambient or normal room temperature. Thereby, the permeability may drop within a range of a few degrees centigrade from a four digit value to that of a completely non-magnetic material. Consequently, by utilizing relatively small heat differences, it is possible to selectively use external magnetic fields of any desired strength. Since the temperature dependent change of the permeability is reversible, it is possible to store the materials which are used for a certain specific manner of carrying out the method of the present invention even at temperatures which are above the working temperature of the respective method.

A permanent latent magnetic image with, for practical purposes, any desired strength of permanent magnetic force can be produced in any range of working temperature provided that, as further proposed according to the present invention, a layer of temperature-dependent variable permeability is introduced as a variable magnetic resistance in a magnetizing or de-magnetizing field which penetrates a permanently magnetizable layer. The magnetic record may then be fixed in a highly coercive magnetic material which may possess a Curie point which is considerably higher than the working temperature of the method, in other words, the magnetic record may then form a latent image in practically any presently known hard or permanently magnetic material. The layer of temperature-depending variable permeability which controls the intensity of the recorded signal need not by itself possess any permanent magnetizability. Such materials are available in all desired temperature ranges.

Since the distribution laws which are valid for electric resistances arranged in parallel are also applicable for the magnetic resistance of two adjacent portions of a layer which is permeated by a magnetic field, the magnetic fluxes through two adjacent portions or points of a layer which is located in an initially homogeneous magnetic field will behave inversely to their local permeability number. Since further the materials which are available for this method possess four digit permeability values which upon heating to above the Curie temperature will drop to the value 1 of a non-magnetic material, it is possible in this manner to achieve very strong differences in the magnetization of the permanent magnetizable material which is located in the same or any identical magnetic flux. Depending on whether a permanent field or an alternating field with decreasing amplitude is present, it is also possible to produce either a positive or negative image.

Very thin and easily heatable layers and a particularly low influence of constant magnetic resistance portions are obtained by exposing a network formed of permanently magnetizable materials of low permeability and materials of high, temperature-dependent variable permeability to a magnetizing or de-magnetizing field.

The method of the present invention may be carried out by utilizing the increase in the permeability which is connected with an increase in the temperature particularly of a ferrite or a mixed ferrite, or the steep drop of the permeability particularly of such materials in the vicinity of the Curie point for producing variations of magnetization according to the image. Particularly the last-mentioned effect is suitable for carrying out a method which works very reliably and gives a great contrast, because in this area of the permeability curve, i.e., in the vicinity of the Curie point, a temperature rise of a few degrees centigrade will convert the magnetizable material from its condition of maximum permeability into a completely non-magnetic condition.

According to a further characteristic of the invention, it is possible to produce a gradated latent magnetic image by utilizing the progressive decrease of the permeability, particularly of a metallic magnetic alloy, for instance an iron-nickel alloy. When a gradated magnetic image which is obtained by means of a gradual increase or decrease of the permeability coacts, for instance with a powder dispersion or emulsion ink layer in which the magnetizable pigment particles are slowed down dependent on the printing speed, then a magnetic half tone print is obtained. Depending on whether the increase or the decrease of the permeability is used, either a negative or a positive copy of the original image is obtained.

Basically, the heat image which is required for producing the latent magnetic image can be applied in any desired manner, for instance by impressing for a short period of time a heated die. However, for quick conversion of an original image which, for instance, is drawn or imprinted on paper, into a latent magnetic image, preferably, the heat image which is required for producing the latent magnetic image is produced by an image controlled heat radiation. The known methods for producing a heat image provide the utilization of reflected as well as of transmitted radiation. With both methods, i.e. with reflected as well as with transmitted radiation, depending on the type of heat contact with the original image, and depending on the length of radiation, positive or negative heat images may be produced. Furthermore, it is also possible to apply the heat image by an optical copying system which may be based on projection through a transparency, or also on projection of light reflected from an opaque image. In each of these reversible radiation methods, it is thus possible to adjust the entire copying method so as to obtain the most desirable positive or negative effect with respect to the prevailing magnetic or copying condition.

In connection with the present magnetic copying method, particularly favorable conditions are achieved according to a further embodiment of the present invention by contacting an original image with a layer of magnetizable material which is interrupted by a translucent screen or raster, whereby the image-forming portions of the original image possess an ability to absorb heat which differs from the ability to absorb heat of the image free portions. This is particularly advantageous when thereby a heat image is produced in a layer of magnetizable material which possesses in the vicinity of the Curie point steeply dropping permeability characteristics, which heat image comprises portions formed at a temperature closely below the temperature at which the permeability reaches its maximum, as well as portions formed at a temperature which is above the Curie point.

When using transitory, latent magnetic images, according to a further characteristic or embodiment of the present invention, an arrangement can be made thus that a transitory or temporary, latent magnetic image is produced in an intermediate layer which is arranged between an external magnetic pole and the backing for the iameg which is to be produced. The image-producing material will then be attracted under the influence of a homogenous magnetic field only at the portions of the backing sheet at which the heat image which has been formed in the intermediate layer has left a sufficient degree of permeability. Since, as described above, the permeability can be changed by one to a thousand or can be brought from a four digit value to the value of a non-magnetic material, it is possible with this arrangement to achieve without difficulties a clearly different actuation of the printing or image-forming and the non-printing or non-image-forming portions.

Particularly advantageous structural conditions are met when the latent magnetic image is formed in a magnetizable carrier layer for the copy of the image which is to be formed or in a magnetically controlled sieve for the image-forming material. The image-forming material or magnetic ink will then be retained at the portions of the carrier layer in which the homogenous magnetic field which acts on the magnetic ink and on the carrier layer can produce large induced magnetic forces due to the still high permeability at these portions. This is preferably the case when the permeability of the carrier layer is considerably greater than the permeability of the magnetic ink and when the induction causing magnetic pole does not directly contact the magnetic ink. The printing magetic ink is particularly firmly retained when it has to pass a regionally strongly magnetically controllable sieve, somewhat comparable with the silk screen process.

The simplest arrangement and at the same time the most imediate control of the attraction of the magnetic ink by the heat image, without any conversion loss is obtained when the latent magnetic image is produced in the image-forming or copy-forming material, for instance in a layer of magnetizable powder or in a magnetic ink layer. Hereagain, in the homogenous magnetic field only those particles of magnetic material will be attracted which still possess a sufficient high degree of permeability. Thereby, negative or positive images may be produced by having the image formed either by the ink or magnetic powder portion which is thus transferred from the original layer thereof, or by the ink or magnetic powder portion of lesser permeability which has not been removed from the layer and which may subsequently be fixed to its original support in suitable manner known in the art.

The term "homogenous magnetic field" as used hereinabove is not meant to denote a field which shows no gradation but is to denote primarily a field which is homogenous at its origin, in other words, which at its origin does not include portions of varying strength, for instance corresponding to an image. It is entirely possible to produce a magnetic field which originates from two immediately adjacent magnetic poles and which is of diminishing strength in the direction towards the image-forming layer, in other words, a magnetic field which in the strict sense of the word would have to be considered an inhomogenous magnetic field, and to shift the same by means of an intermediate or carrier layer of variable permeability in parts into the image-forming layer.

The effect of the arrangement according to the present invention can be further increased if the latent magnetic image is produced in a plurality of adjacent layers of magnetizable material which possess complementary magnetic properties. Thus, for instance, a magnetic image may be produced in a carrier for the magnetic ink as well as in the magnetic ink itself. If in such case the permeability of the magnetic ink has characteristics opposite to that of the carrier, then, at the heated portions, an intensified transfer of the magnetic ink onto the carrier sheet for the copy which is to be produced, or by reversal of the characteristics, an increased adherence of the not or less heated portions of the magnetic ink at their original support will be accomplished. The same holds also true for the combination of magnetic ink and intermediate layer with identical characteristics, and intermediate layer and support also with identical characteristics, as well as basically also for the combination of three layers, although in the latter case the exact application of the heat image becomes somewhat more difficult.

By utilizing the permanent latent magnetic image, it is possible to produce the same according to a further embodiment in the present invention also in the image-forming material. For instance, it is possible in a very simple manner by using an intermediate layer of variable permeability to accomplish a permanent magnetization of the magnetic ink corresponding to the image which is to be reproduced. The transfer of a thus prepared ink onto a carrier sheet can be achieved by the simply expedient of placing underneath a highly permeable material, for instance a soft iron plate.

A particularly effective separation of the printing and the non-printing portions of the magnetic ink, i.e. of the image-forming portions of the magnetic ink from the remainder of the layer of magnetic ink can be achieved under utilization of the permanent latent magnetic image by using a permanently magnetizable sieve for the image-forming material such as a magnetic ink or magnetizable powder, which for instance under interposition of a variably permeable intermediate layer which has been magnetized or demagnetized in a pattern corresponding to the image which is to be reproduced.

According to a further embodiment of the present invention, the image-forming material may be applied onto a permanently magnetizable carrier layer which contains the latent magnetic image, which carrier layer has been premagnetized or de-magnetized under interposition of a variably permeable intermediate layer. It is possible to operate with the smooth surface of a thus produced printing form in a manner somewhat similar to the conventional litho printing. Due to the fact that the inking in, as well as the printing and the cleaning is carried out without direct contact, this method can be carried out in a much simpler manner than litho printing and the useful lifespan of the printing form is considerably prolonged.

Such permanently magnetizable carrier layer containing the latent magnetic image is particularly suitable for attaching to a printing cylinder, whereby the printing form may be applied and extinguished in the printing machine. This possibility may be utilized in a particularly advantageous manner in connection with the partial printing according to the so-called "system printing" which is described for instance in U.S. Patent 2,925,032.

It is also possible to form on a foil a layer which may be magnetized corresponding to an image and to attach the foil with the magnetizable layer thereon onto a printing machine which may be provided with special magnetic ink supply and cleaning devices. Furthermore, such foil of synthetic material or paper on which an image has been formed by application of a magnetic pigment or magnetic ink may serve not only as printing form but also as a copy of the original image by suitably fixing the image-forming magnetic pigment or ink thereon.

Several methods are known for making the latent magnetic image visible. Preferably, according to a further embodiment of the present invention, the latent magnetic image is made visible by means of a magnetizable powder with the individual particles thereof coated with a material which will melt at a temperature above the working temperature required for the forming of the magnetic image. In this case, the fixing of the image formed of the magnetizable powder on a carrier sheet can be carried out in a very simple manner by heating above the working temperature to the melting temperature of the coating, whereby this melting temperature may be sufficiently high so that the magnetizable powder having such coating may be stored in the vicinity of room heating devices such as radiators or the like without endangering the storability of the coated powder. This method is particularly suitable for magnetic duplication processes.

According to another embodiment of the present invention, in a magnetic printing method, the latent magnetic image is to be made visible by means of a magnetic printing ink wherein in a known manner a proportion of magnetic pigment which is as high as possible is bound in a binder which will be taken up by paper. The large magnetic forces which can be controlled according to the present invention permit application of the magnetic dye onto a carrier sheet without direct contact between the magnetic dye layer and the carrier sheet. Due to the absorbability of the binder in the carrier sheet, the printed sheets may be immediately stacked so that the magnetic printing process can be carried out with the same speed as conventional printing processes.

According to the present invention, a device for carrying out the method of the invention preferably should include at least a motor driven transporting roller, a source of heat radiation and an elongated magnetic bar such as is used for instance for extinguishing recordings on magnetic tapes. A particularly simple duplicating device is obtained by providing a hollow cylinder which preferably carries at its outer surface a translucent screen or a plurality of closely adjacent grooves and which is contacted by a sheet carrying the original image, as well as by a backing sheet for the copy which is to be produced. The cylinder serves as carrier for the image-forming magnetizable material, which is deposited in the grooves. Furthermore, a permanent magnet is provided which holds the portions of the magnetic powder, which serve for forming the image, in the grooves while the cylinder surface rotates downwardly, so that the not image-forming portions of the pulverulent material will fall off the cylinder surface. The magnet is arranged so as to act on the magnetizable powder between a heating area in which the same is heated corresponding to the image which is to be copied, and a transfer area or printing line in which the cylinder surface is preferably located directly above the backing sheet for the copy which is to be produced.

Futhermore, in a simple device according to the present invention for producing undistorted, authentic copies, an endless resilient carrier band is provided which on its outer surface is formed with translucent grooves and which passes through a bath of magnetic ink and a heating zone, whereby the outer surface of the band serves as carrier for the magnetic ink which represents the image-forming material. Immediately following the heating zone, in the direction of movement of the endless band, a permanent magnet is provided which will draw the image-forming portions of the magnetic ink onto a carrier sheet which passes in the vicinity but out of contact with the endless band.

A device which permits the printing of a large number of copies as well as the printing of single copies or system copies includes, according to a further embodiment of the present invention, a cylinder which carries a permanently magnetizable carrier layer for the image-forming material and around which a device for applying the heat image, a magnetizing or de-magnetizing device, a supply device for magnetic ink, a paper transporting device, a counter roller and a cleaning device are arranged. Preferably, there are also provided a pattern carriage for carrying the original image which is to be copied or printed and which carriage will move with a speed corresponding to the circumferential speed of the cylinder, furthermore, a mirror which can be interposed into the path of the heat rays which form the heat image, as well as a thermostatically controlled heating device for maintaining a cylinder temperature which is slightly below the working temperature of the method. The ink supplying device, preferably, will include an ink container having a permanently magnetized outlet opening or screen opening, the magnetic forces of which will permit the flowing out of the magnetizable ink only under the combined influence of the gravity acting on the magnetic ink and the magnetic force of the ink carrier layer.

The strong permanent magnetic image which can be produced according to the present invention can be used in a particularly advantageous manner for carrying out magnetic printing by applying to a carrier layer which is permanently magnetized in accordance with the image to be reproduced, a magnetizable material forming on the carrier layer a relief corresponding to the magnetic image, and the raised portions of which can be inked with conventional relief printing ink. Preferably, the surface of the carrier layer is provided with grooves or the like, in order to prevent a dislocation of the relief image during the printing process.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 9:
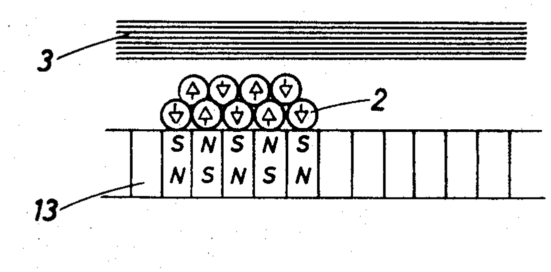
Figure 10:
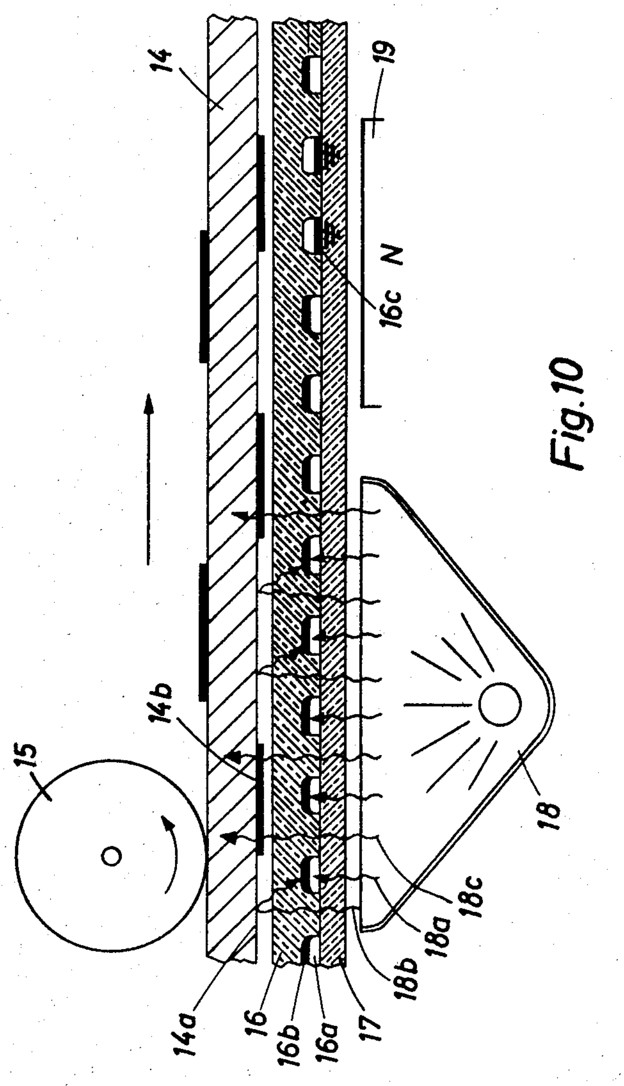
Figure 11:
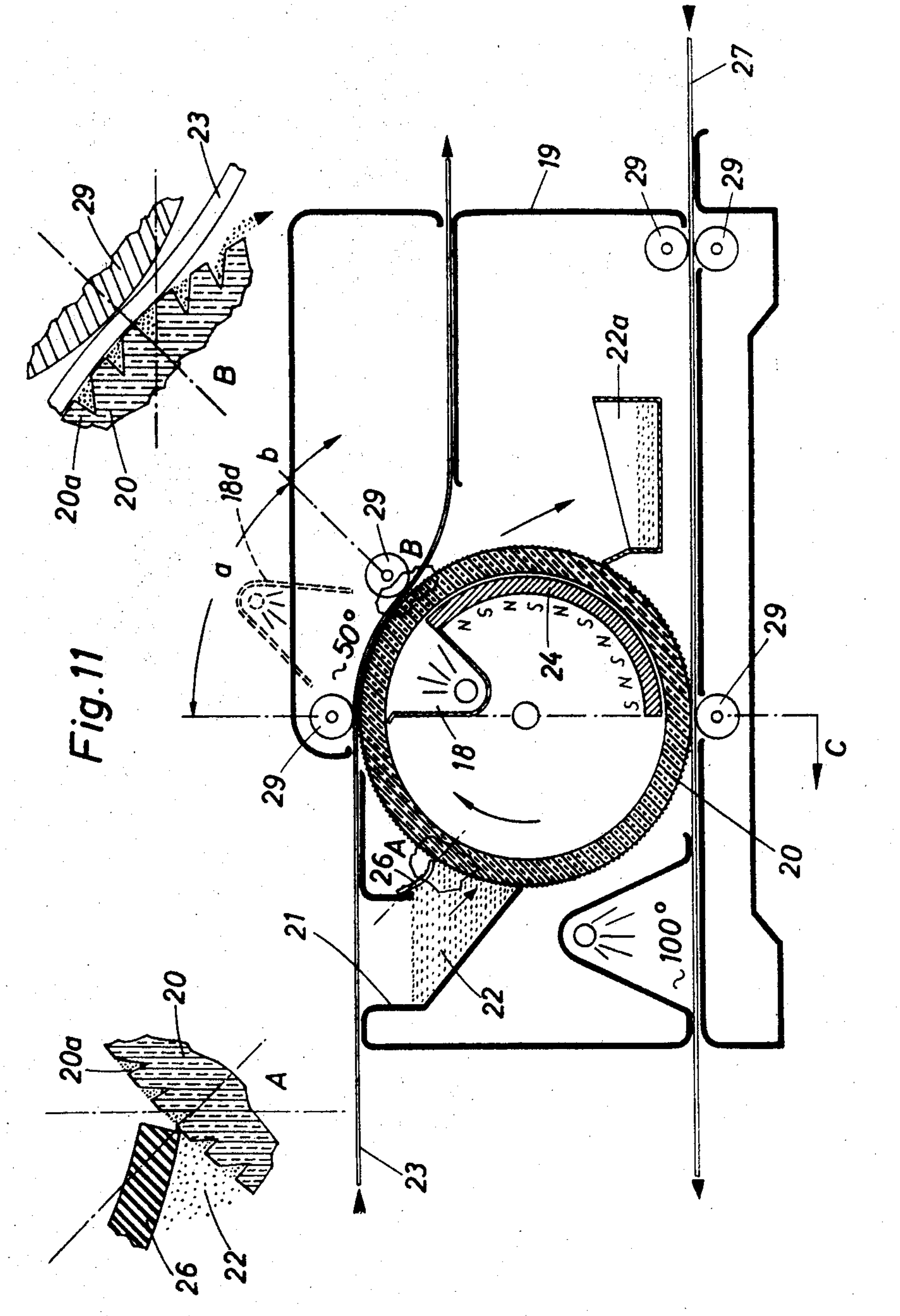
Figure 12:
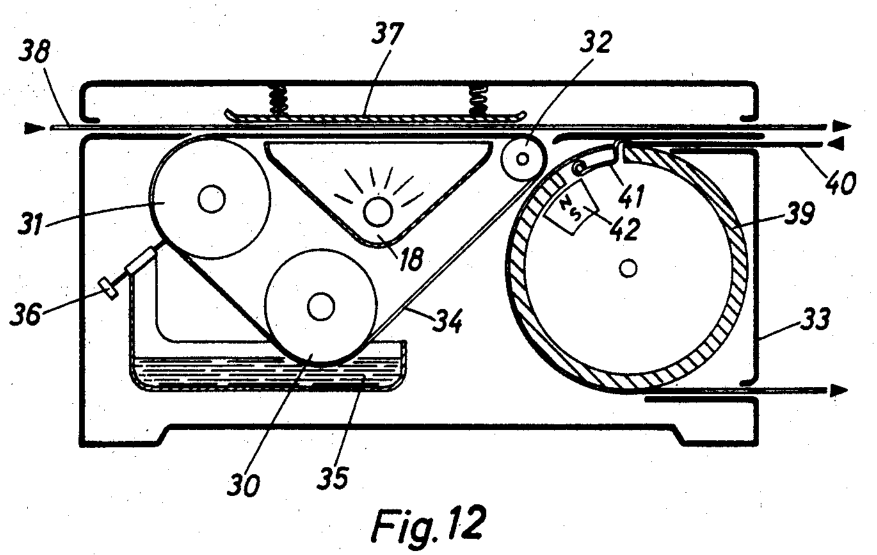
Figure 16:
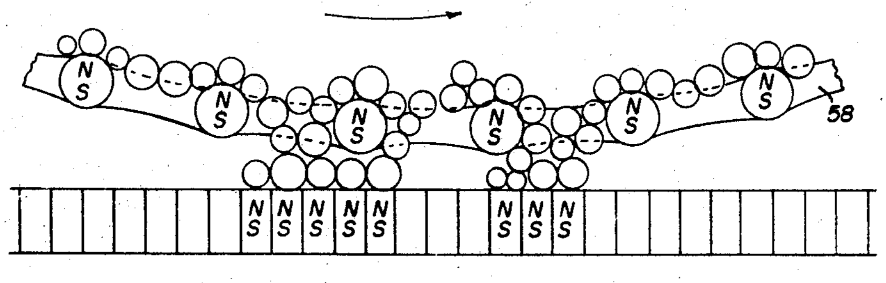
Figure 13:
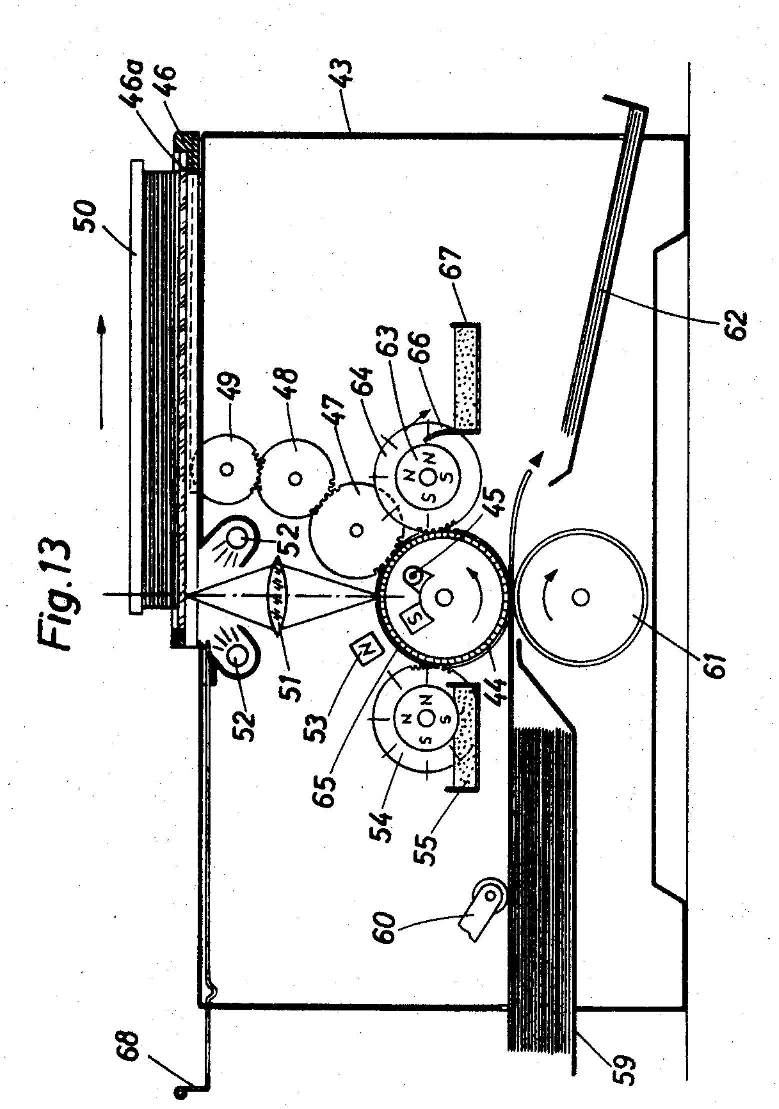
Figure 14:
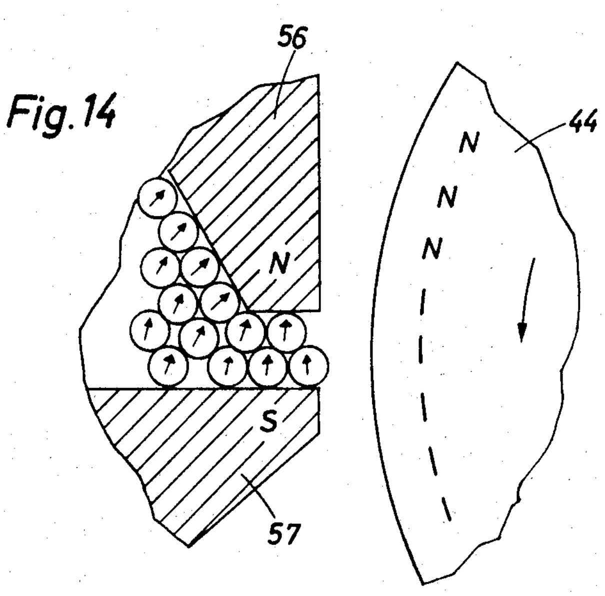
Figure 15:
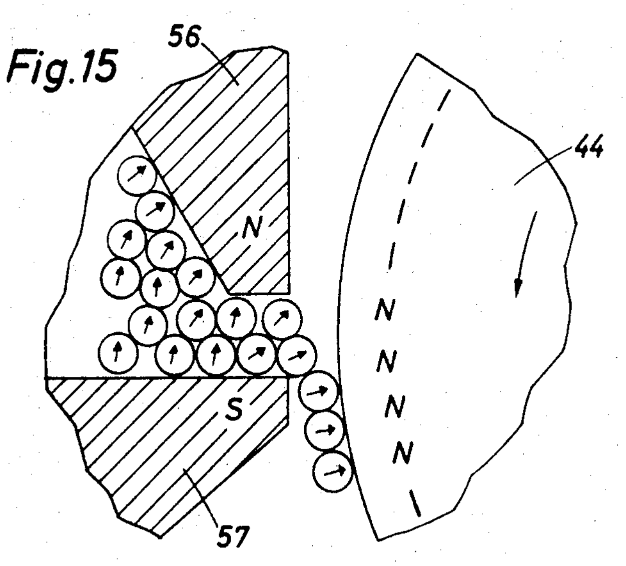
Figure 17:
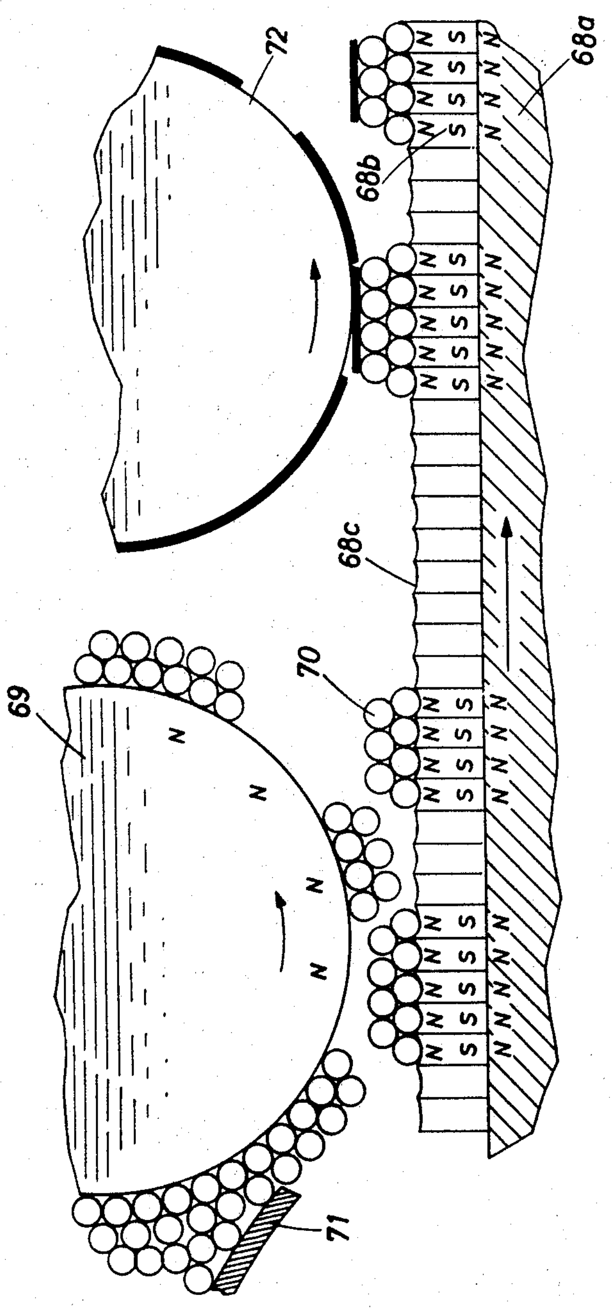

FIG. 9 schematically illustrates the use of a permanently magnetizable ink carrier layer;

FIG. 10 illustrates a simple magnetic copying device which utilizes an ink raster or screen;

FIG. 11 is an elevational cross-sectional view through a magnetic copying device wherein on a transfer cylinder a magnetic pulverulent image is formed which may then be transferred to any desired backing sheet;

FIG. 12 is a cross-sectional elevational view of a magnetic copying device which is suitable for forming a copy of magnetic printing ink on any desired type of backing sheets;

FIG. 13 is a cross-sectional elevational view of a magnetic printing device employing a permanent magnetic printing form which is produced within the device;

FIGS. 14–16 illustrate schematically devices for applying ink to a magnetic printing device; and FIG. 17 is a schematic elevational view of a magnetic relief printing arrangement.

Figure 1:
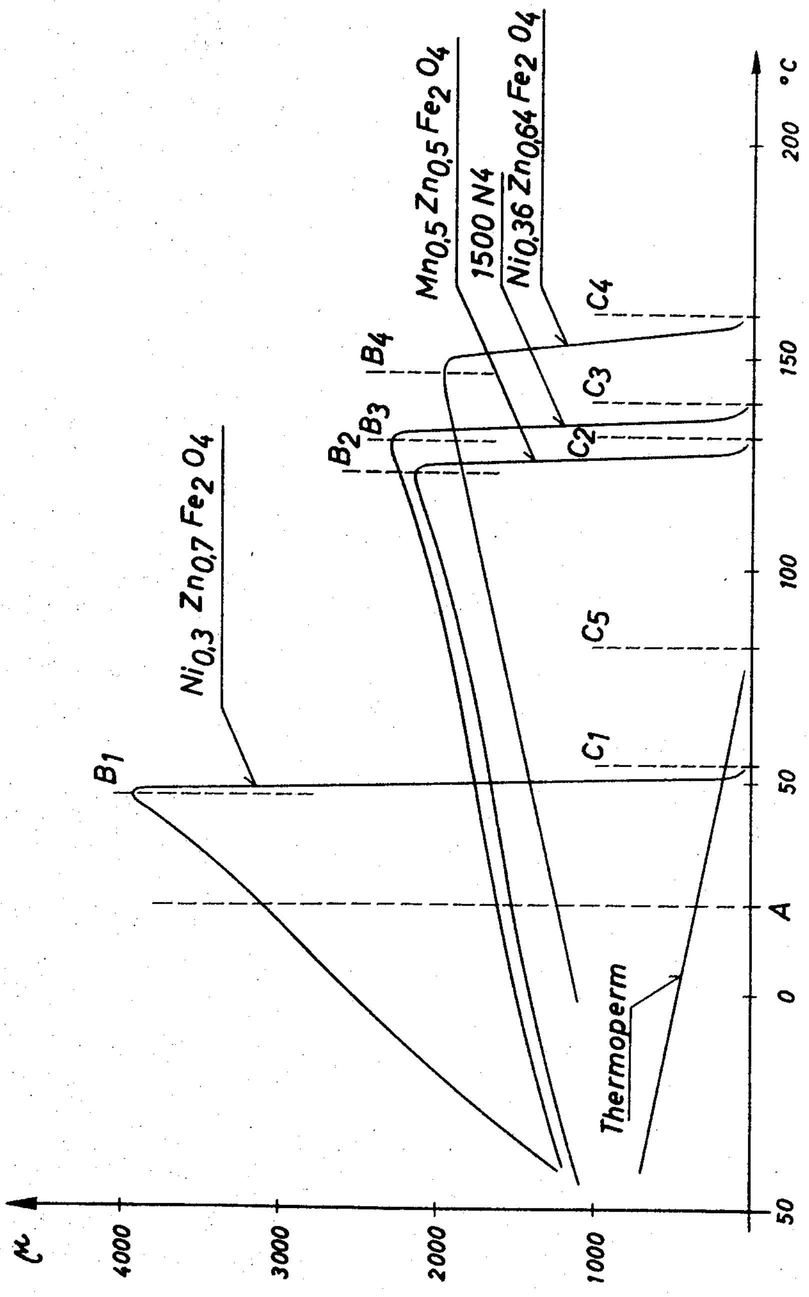
FIG. 1 shows the permeability curves of several materials which are suitable for producing a transitory, latent magnetic image, as a function of the temperature.

Referring now to the drawing, and particularly to FIG. 1, the mixed ferrites $Ni_{0.3}Zn_{0.7}Fe_2O_4$, $Ni_{0.36}Zn_{0.64}Fe_2O_4$ and $Mn_{0.5}Zn_{0.5}Fe_2O_4$ are taken from the treatise "Ferrite" by Dr. J. Smit, Dr. H. P. P. J. Wijn, Philips technische Bibliothek 1962. The first two mentioned materials belong to a system of materials within which the temperature-dependent properties of the materials can be continuously changed as a function of the proportion of Ni or Zn. "1500 N4" is the trade name of a ferrite which is obtainable from the firm Siemens and Halske AG for use in high frequency cores. "Thermoperm" is the trade name of an iron-nickel alloy which is available for temperature compensation in magnetic loops and produced by the firm Krupp.

If the ambient room temperature is indicated by A, the temperature at which the permeability reaches its mavimum by D and the temperature at which the permeability of the material drops to the value 1 of a non-magnetic material, which temperature is substantially identical with the Curie temperature, is indicated by C, it will be seen that heating of the materials from A to B1–B4 will cause an approximately linear rise of the permeability by a factor of about 1.5 in each case, which upon suitable arrangement of the magnetic field and the retarding forces in the binder containing the magnetic pigments may be used for producing a magnetic image. In the case of heating Thermoperms from A to C5, a permeability curve is found which drops by the factor 100 with substantially linear graduation, which for instance, is suitable for producing magnetic half-tone prints.

Particularly favorable conditions are obtained when the temperature difference between B and C is used for forming the magnetic image. Thereby heating by less than 5° C. will cause a sudden change in the degree of permeability by a factor of 1000. With devices operating in this range of permeability change, it is not necessary to take particular care with respect to the adjustment between the magnetic fields and the retarding forces of the magnetic pigment. If the pigment itself consists of a material which within the working temperature range of the method possesses a suddenly changing permeability, then the pigment will be attracted at the temperature B by very weak magnetic fields, while upon exceeding temperature C, the pigment cannot be moved even by the strongest magnetic fields because it has become completely non-magnetic.

In this manner, it is possible with the help of relatively low degrees of heating to control magnetic fields which are capable of achieving the desired effect with a very high degree of certainty. Therefore, the required heating can be carried out in such a manner that the temperature-dependent layer is generally heated by a thermostatically controlled heat source to the temperature B which preferably is slightly above the maximum possible temperature of the surrounding area. For producing the latent magnetic image it is then only necessary to carry out an additional heating of the image-forming portions by less than 5° C. These small temperature differences can be applied even with the help of copying systems for transparencies as well as those which project light reflected from an opaque image, although particularly the latter are of relatively low efficiency.

When a strong heat source is available, it is not necessary to carefully control the same, since for producing a difference in the permeability by the factor 1000, it suffices if part of the layer is heated to any temperature between A and B while other portions of the layer are heated to a temperature above C which may be higher than temperature C to any desired extent, provided that the temperature does not reach the point at which the original image or for instance the paper backing sheet thereof will be yellowed.

It is known from the pertinent literature that in addition to the materials illustrated in FIG. 1 there exist a great number of other materials which are suitable for carrying out the process of the present invention. Thus, cobalt mixed ferrites are known with a steeper rise and a shallower drop of the permeability curve, as well as magnetic metal alloys with Curie points which may be chosen as desired. Furthermore, it was found experimentally that the temperature curves of materials which were not produced for the purpose of having specific Curie points, very frequently represent the average values of a mixture from which by means of magnetic separation after heating to specific temperatures, groups of material with a correspondingly smaller variation of the temperature dependency can be obtained.

Figure 2:
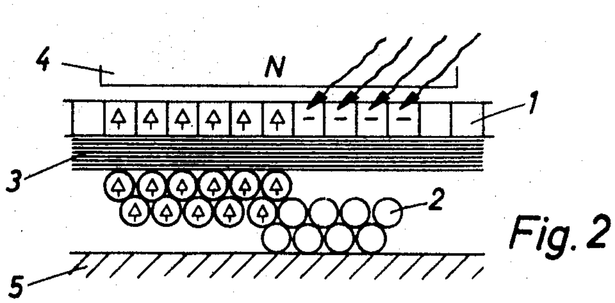
FIG. 2 shows a schematic arrangement for the forming of a transitory, latent magnetic image in an intermediate layer.

According to FIG. 2 a temperature dependent, permeable layer 1 is arranged as a magnetic resistance in the field of a magnet pole 4 which attracts the magnetic ink particles 2 onto a backing sheet 3 which may consist, for instance, of paper. In this case, the backing sheet or support 5 for the ink is formed of a magnetically neutral material.

In order to stress what is to be essentially shown in this and the following schematic representations, the details of the application of the heat image and of the fixing of the copy are not illustrated therein. In FIGS. 2–9, heating is shown by wavy arrows, induced magnetism by small arrows and permanent magnetism by N or S, whereby the opposite pole or magnetic conductor which is generally required for producing the magnetic field, has not been illustrated. A small minus sign indicates that at this point either the permeability has disappeared or, in the case of the permanent magnetic image, no magnetization has been produced. In accordance with these symbols, FIG. 2 shows that at the portions of the intermediate layer which are not touched by the heat rays, due to the there still present permeability, magnetism is induced which is transmitted to the permeable magnetic ink particles which thereby, at these portions, are attracted to the carrier layer.

Figure 3:
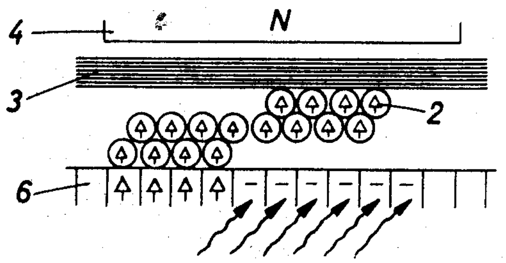
FIG. 3 shows an arrangement wherein the transistory, latent magnetic image is produced in a carrier layer for the image-forming magnetic material (ink)

According to FIG. 3, the permeable ink particles 2 are firmly held at such portions of a highly permeable support which possess within the working range of the method a strongly varying permeability, at which the high permeability and the magnetism which is induced in this layer by magnetic pole 4 has not disappeared due to heating, or at least has not dropped below the value presented by the ink.

Figure 4:
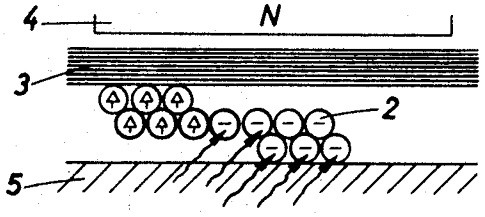
FIG. 4 shows the forming of a transitory, latent image in a magnetizable ink layer.

According to FIG. 4, magnetic ink 2 possesses a preferably high permeability and in any event a permeability which within the working temperature range of the method is clearly temperature dependent. By means of an external magnetic pole 4 a sufficient magnetism is induced into the dye particles which have not been heated above a predetermined temperature, which magnetism suffices for attraction of these dye particles onto carrying sheet 3.

Figure 5:
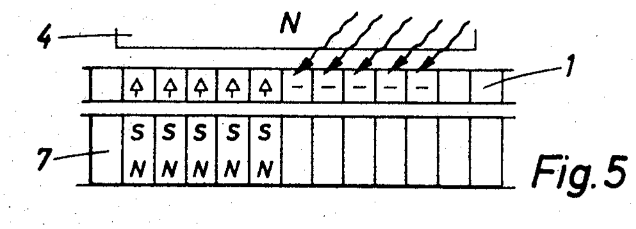
FIG. 5 is a schematic showing of the forming of a latent magnetic image in a permanently magnetizable layer by means of an intermediate layer of temperature dependent permeability which is inserted as a variable, magnetic resistance into the magnetizing or de-magnetizing field.

According to FIG. 5, a layer 1 having a temperature-dependent variable permeability is located in the magnetizing or demagnetizing field of external magnetic pole 4 which affects a permanently magnetizable layer 7. For the purpose of magnetization, pole N may be formed either by a strong permanent magnet or by a direct current coil. For demagnetization, the same coil is fed with alternating current. The carrier layer 7 is then moved jointly with intermediate layer 1 past pole 4. Intermediate layer 1, previous thereto has been heated in accordance with the image which is to be printed or copied, whereby each portion of permanent magnetic layer 7 passes through the tapered or decreasing alternating field which is required for demagnetization.

Figure 6:
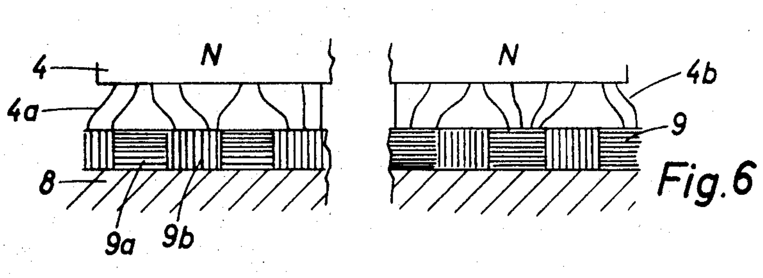
FIG. 6 shows a raster or screen of highly coercive and temperature-dependent permeable, magnetizable material arranged in a magnetic field.

FIG. 6 shows a thin screen or raster 9 which may be formed on a magnetically neutral or generally constant permeable support 8 by a conventional printing process. Raster 9 consists of highly coercive portions **9*a* and temperature dependent permeable portions 9*b*. If this raster consists for instance of magnetic pigments such as the one known as "Bayer S11" which is used for producing magnetic recording tape and which has a coercive force of 800 oersteds and a permeability of the magnitude of 10, and of the mixed ferrite $Mn_{0.5}Zn_{0.5}Fe_2O_4$ which has a maximum permeability of about 2,000, then at temperature $B_2$ according to FIG. 1, the by far largest portion of the lines of magnetic force 4*a* will pass through ferrite 9*b*. However, at temperature C2 at which the permeability of the ferrite has dropped to the value 1, the lines of magnetic force 4*b* will be passed to a large extent through the raster portions 9*a*** which consist of "Bayer S11" and which now possess the higher permeability and will give to these raster portions a permanent magnetization or, when an alternating field with decreasing amplitude is applied, will extinguish the previously present premagnetization.

Figure 7:
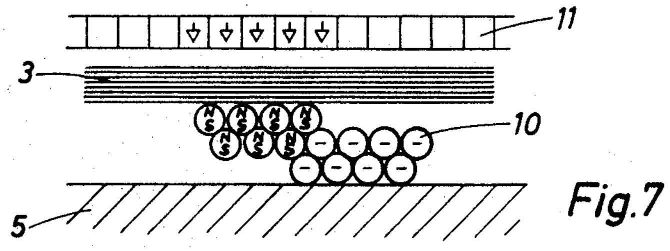
FIG. 7 is a schematic illustration of the forming of a copy by using a permanently magnetizable magnetic ink.

According to FIG. 7, a magnetizable ink layer 10 is applied to a magnetically neutral support 5. Ink layer 10 has been magnetized according to one of the methods described further above in conformance with an image so as to form a magnetic image. The permanently magnetic ink portions caused by induction magnetization of a highly permeable layer 11 located behind the support for the image copy to be produced, and the magnetized image forming ink portions are attracted in this manner to the support 3.

Figure 8:
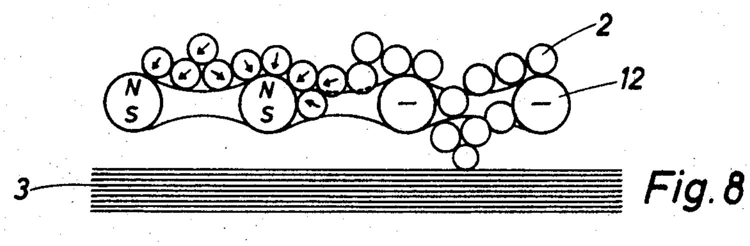
FIG. 8 illustrates schematically the use of a magnetizable sieve for applying a soft magnetic ink.

According to FIG. 8, a magnetic ink 2 is applied to a support 3 with interposition of a magnetized sieve which carries a latent magnetic image. At the magnetized portions of the sieve, the preferably highly permeable ink particles cannot pass the sieve and thus a magnetic screen print is produced. This effect can also be obtained with a magnetically controlled sieve which is formed of a material of temperature dependent permeability.

FIG. 9 shows a foil 13 to which ink has been applied by conventional means, for instance an applicator roller which does not contact foil 13, by applying magnetic whiskers or the like so that the dye is applied only at the image forming magnetized portions of foil 3. The magnetization has been carried out in a known manner with varying polarity in order to achieve a better contrast or a sharper delineation of the magnetic fields. The printing from a thus inked foil can be carried out in an offset manner, if desired also with interposition of a transfer cylinder.

According to FIG. 10, a paper 14 carrying prints on both sides is passed by means of a motor driven transport roller 15 together with a translucent ink raster or screen foil 16, 17 along a source of heat radiation 18 and an elongated magnetic bar 19. Printed paper 14 and ink screen foil 16, 17 move at the same speed. The elongated magnetic bar 19 may consist, for instance like the permanent elongated magnets which are used for extinguishing tape recordings, of two immediately adjacent poles, or it may also consist of an elongated, possibly controllable arrangement of magnetic coils. Any desired source of red and infrared light may serve as source for heat radiation, however, in order to obtain a sharply defined heat image, the radiation should be as intensive as possible. For rotating roller 15, preferably a geared or adjustable motor is used so that the length of the radiation period may be adjusted to the heat absorptivity and starting temperature of sheet 14 or of foil 16, 17.

Foil 16, 17 consists of two layers 16 and 17 which are preferably adhered to each other with a conventional pressure sensitive adhesive. Carrier layer 16 may consist, for instance, of a translucent paper or polycarbonate foil and is formed at its surface with groove or cup shaped indentations 16*a* which may have been embossed into carrier 16 or formed together with the same in a casting or extrusion mold. Indentations 16*a* are filled at their bottom portion with a preferably highly viscous, nondrying, magnetizable printing ink 16*b*. Printing ink 16*b* fills the indentations 16*a* only partly and does not reach the surface plane of foil 16. This can be achieved, for instance, by removing excess printing ink with a rubber rake in a manner known, for instance, in intaglio printing processes.

Cover foil 17 which is preferably dulled at its inner face and which consists of transparent paper or synthetic material will make printing ink 16*b*, when located at the base of the indentations 16*a*, practically invisible. Only portions 16*c* of the printing ink which by the action of elongated magnet 19 have been brought in immediate contact with cover foil 17 will be visible through the same.

If the magnetizable constituents of the printing ink consist of a magnetic material possessing the temperature dependent permeability required according to the present invention, then only those portions of the printing ink will become visible, whose permeability, corresponding to the heat image will permit attraction by external magnet pole 19.

In this one-sheet method, the heating in correspondence with the image which is to be copied can be carried out by a reflex method without interposition of a further layer. However, also by means of transmitted radiation positive right side right images are formed. This method will give authentic copies only if the cover foil 17 is torn off after the copying process and if a printing ink is used which contains an oil or binder which is absorbable in the material of the cover foil 17.

It is also possible to write on the unused foil 16–17 or on the foil on which a copy has been produced by means of a magnetic stylus or the like. The material, i.e. the composite foil 16–17 can be stored prior or after the copying process for any desired length of time, even at high temperatures.

The heat image is formed by the direct general radiation 18*a* in combination with the additional radiation 18*b* which corresponds to the image forming portion and which is achieved by the reflecting portions 14*a* of the sheet 14. The absorption heat which is formed by the radiation 18*c* in the dark portions 14*b* of sheet 14 will be effective only upon very prolonged radiation and very close heat contact between sheet 14 and carrier 16. This translucent raster or screen arrangement which, as will be described below, is used according to several embodiments of the present invention permits to heat the ink even above yellowing temperature of sheet 14 or the like, provided that the absorption of heat rays 18*a* and 18*b* by the ink is stronger than the absorption of heat rays 18*b* and 18*c* by sheet 14. The absorption of heat rays by sheet 14 can also be controlled by pretreatment of sheet 14 with a more strongly reflecting protective lacquer.

In FIG. 11, reference numeral 19 denotes the housing of a simple office copying device. In this housing is arranged a translucent cylinder 20 formed of glass or synthetic material. At its surface, cylinder 20 carries a fine screen or raster 20*a* which consists of groove shaped indentations which may be formed for instance by etching. As shown in more detail at A and B indentations 20*a* preferably are of scoop wheel cross section so that on the one hand, they will be capable of carrying along magnetic powder 22 when passing funnel 21 and, on the other hand, will be capable of throwing off the portion of the powder which by heating has become non-magnetic and which is not needed for forming the image, immediately after passing through heating zone *a*. The application of the powder can, if necessary, also be assisted by the proper application of magnetic fields.

Heating can be carried out in reflex process by means of a heat source 18 located in the interior of cylinder 20, or by means of transmitted radiation, utilizing an external heat source 18*d*. The powder which is to be heated is located in the immediate vicinity of the original image 23 so that a sharply defined heat image will be formed. Due to the fact that any powder which might extend outwardly of the raster indentations is raked off by means of rubber rake 26, contamination of original image 23 cannot take place.

Immediately following heating zones *a* a magnetic field is arranged which covers the entire zone *b* along which the portions of the powder which have been converted by the application of heat are to be thrown off. This magnetic field may be formed, for instance, by a permanent magnet plate 24 located inside cylinder 20. By means of this magnetic field, the portions of the powder which have remained below the conversion temperature and which correspond to the black portions of original image 23 will be held on the surface of cylinder 20. Since glass and synthetic materials are very poor heat conductors, a harmful heat conduction in the short transfer period is not to be expected. It is also impossible that during this short period of time heat flow can take place within the magnetic powder which is located in the small raster indentations. Thus, the sharpness of the image is limited by the dimensions of the very small raster grooves and the even smaller particle size of the pigment which is chosen as small as possible.

The portion of the magnetic powder which during application of the heat image has become non-magnetic as well as non-magnetic binder constituents or the like which would interfere with the forming of the copy or the image, will drop under the influence of gravity into collecting vessel 22*a*. This dropping can be supported, if necessary by mechanical, pneumatic or electrostatic forces. The powder image which remains on cylinder 20 will drop upon reaching the end of the inner magnetic field or of permanent magnet plate 24, under the influence of gravity, onto the support sheet 27 which contacts the lowermost portion of cylinder 20 along a printing line. Copy sheet 27, for instance, may be a regular paper sheet. Since the circumferential speed of cylinder 20 is equal to the forward speed of copy sheet 27, the transfer of the magnetic powder takes place without distortion of the image. The exact transfer can be supported if desired by properly arranged magnetic fields.

The fixing of the image formed by the magnetic powder on copy sheet 27 can be accomplished for instance with a spray lacquer, or by means of an adhesive layer which has been previously applied to copy sheet 27 or the like. According to the presently described example, the individual particles of the magnetic powder which have a Curie point of about 50° C., are coated with a synthetic material which will melt at a temperature of about 100°–110° C. A source of radiant heat 28 serves for heating the powder image on carrier sheet 27 to such temperature of 100°–110° C. so that the powder image will be molten onto carrier sheet 27. For the movement of the original image carrying sheet 23 and of copy sheet 27, guiding rollers 29 are provided which preferably are rotated by means of a joint adjustable motor and which simultaneously are coupled with an interposed suitable transmission to rotating cylinder 20.

As illustrated in FIG. 12, a translucent endless carrier band 34 of synthetic material, for instance of Teflon or silicone rubber is arranged about guide rollers 30, 31 and 32 which are supported in housing 33. Guide roller 30 is partly immersed in ink container 35 so that the grooves or pattern indentations in the surface of band 34 are filled with magnetic ink while band 34 passes around the immersed portion of guide roller 30.

The magnetic printing inks which are used in the process carried out in the device illustrated in FIG. 12 preferably have a composition similar to that of printing inks which up to now were applied by means of conventional printing methods to form magnetically readable indicia. Preferably the printing ink contains the highest possible proportion of magnetic pigment which is bound with a binder material which is similar to an offset oil and quickly taken up by the carrier sheet on which the image is to be formed. It has been found that an ink which is transferred from band 34 to the paper backing sheet on which the image is to be formed under exclusive utilization of magnetic forces, and without direct contact between the ink on band 4 and the carrier sheet, is capable to carry along the portion of the binder material which is associated with the transferred portion of the ink and the transferred ink portion will be drawn into the paper together with the binder material.

Sometimes it is desirable to coat the magnetic pigment particles with synthetic material or the like in order to achieve a higher affinity to the printing oil or binder material. The viscosity of the ink can be adjusted to the specific use or printing process, for instance surface printing or other printing processes, which are to be carried out.

Excess ink which is located at the ridges between adjacent grooves of the raster is raked off in known manner by means of rubber rake 36 which reaches below the outermost portion of the ridges so that the original image on sheet 38 will not be soiled when it is pressed by plate 37 against band 34.

The forming of the heat image can be accomplished again either by a reflex method through the raster or by transmitted radiation. It is important according to the illustrated embodiment that the length of the path, and consequently the time period, between forming the heat image and the point of transfer of the magnetic ink portions corresponding to the image, is short. This is achieved according to FIG. 12 by giving a small diameter to guide roller 32 which guides band 34 to the printing area. It is thus achieved that the area of exposure to radiation and thus the time of heat radiation and the formation of the heat image is a multiple of the distance or time of passage from the end of the heat radiated zone to the point of transfer of the printing ink to a carrier sheet onto which a copy is to be produced. Thus, the heat image will still be undamaged and intact at the point of transfer of the ink. With respect to the sharpness of the image formed on carrier sheet 40, conditions are about the same as described in connection with FIG. 11. In the interior of counter cylinder 39 which serves to pass paper or backing sheet 40 by means of a gripping device 41, if desired without direct contact, along the printing area, a strong permanent magnet 42 is located. The field of this magnet will cause transfer of the portions of the ink which have remained below the conversion temperature and which will correspond to the dark portions of the original image, from band 34 onto backing sheet 40. The binder materials which are in contact with the magnetic pigment particles will be drawn into the paper web 40 in the same manner as in the case with offset printing inks and thereby quick drying of the newly formed image will be achieved which permits deposition of the printed sheets on a support without smearing.

Band 34 need not be cleaned after it has passed the printing zone but will be immersed with the residual ink thereon which corresponds to the non-printing portions, into the ink located in container 35 and there the residual ink which has been carried along on band 34 will be cooled to a temperature below the conversion point. Cleaning after completion of the print run is carried out by means of a foil applied for this purpose onto the printing cylinder and after ink container 36 has been removed and heat source 18 has been extinguished.

As shown in FIG. 13, a preferably highly permeable printing cylinder 44 is positioned in a printing machine housing 43. Printing cylinder 44 carries at its surface a double layer which may be permanently magnetized in accordance with the present invention, as schematically illustrated in FIG. 5. In order to be more easily heated, the layers may be heat insulated with respect to printing cylinder 44, or printing cylinder 44 may be heated by thermostatically controlled heating device 45 to a temperature which is closely below the working temperature of the double layer.

Pattern carriage 46 is coupled during application of the heat image to printing cylinder 44 by means of gears 47, 48, 49 and 65, one of which may be uncoupled, so that upon operation of these gears, the surface of the cylinder will move at a circumferential speed equal to the speed of pattern carriage 46. An original image 46, for instance the open page of a book 50 which is placed onto the glass plate 46 can thus be undistorted transferred to the cylinder surface by means of a copying system 51, during movement of the pattern carriage from the left side toward the right side of FIG. 13. The radiation of the original image is carried out by a suitable source of heat radiation 52, whereby the rays which are reflected by the light portions of original image 50 are directed towards the surface of cylinder 44 by means of the copying system or lens system 51 which preferably consists of lenses made of glass which is highly transparent for heat rays.

The portions of the cylinder surface which are thus heated corresponding to the original image pass immediately thereafter through the field of a magnetizing or demagnetizing device which is indicated in FIG. 13 by poles N and S. Thereby, these heated portions will be magnetized or demagnetized as the case may be in accordance with the pattern of the original image. The thus produced latent magnetic image is then provided with ink in an inking device which in the direction of rotation of cylinder 44 follows the magnetizing device. The inking device may consist for instance of a rotating magnet 54 on which magnetic dye taken from container 55 will attach in the form of magnetic whiskers. These magnetic whiskers pass over the portion of the surface of cylinder 44 which have not been premagnetized, while at the magnetized portions ink particles will be transferred to the surface of the cylinder.

In the device illustrated in FIG. 13 the passage of copy paper is arranged in conventional manner. FIG. 13 illustrates in a semi-schematic presentation a table 59 carrying a stack of the unprinted copy paper, a roller arrangement 60 for passing sheets of the copy paper through the printing zone, counter-pressure roller 61 and table 62 on which the imprinted sheets are collected.

Cleaning of printing cylinder 44 is carried out after producing the desired number of copies, by means of a magnetic cleaning device. For this purpose, a permanently magnetizable roller 63 which by means of gear 64 can be coupled with gear 65 and attached to the printing cylinder, may be moved into the vicinity of the printing cylinder. Roller 63 will attract the residual magnetic ink on printing cylinder 44 so that the same will be transferred to roller 63 without requiring contact between printing cylinder 63 and roller 44. Rake 66 rakes off the thus collected ink from roller 63 and passes the same into collection vessel 67. Roller 63 which may be moved from a position close to cylinder 44 to a position more distant from the same may also be replaced by a firmly positioned and continuously rotating roller which may be magnetized by a magnetic coil.

For extinguishing the magnetic image on cylinder 44, a mirror 68 is pushed into the path of the rays emanating from heat source 52. Thereby, upon further rotation of printing cylinder 44, all temperature depending layer portions of variable permeability on the printing cylinder will be heated evenly and upon again passing magnetizing device 53 will be evenly magnetized or demagnetized. If the device illustrated in FIG. 13 is to be used for carrying out so-called system printing, then in a very simple manner, an original image which contains all data can be partially covered prior to forming each new heat image.

FIGS. 14 and 15 show another manner of applying ink. According to these two figures, two elongated magnetic poles 56 and 57 form between each other a narrow outlet slot which prevents the magnetic ink against the force of gravity from flowing out (FIG. 14). This effect of the magnetic poles can be overcome only at such points which are juxtaposed to a magnetic pole of the cylinder surface (FIG. 15).

FIG. 16 shows an ink supply device which in view of its particular simplicity may also be used for inking by hand a foil on which a magnetic image has been formed. The selective blocking is achieved in this case by an evenly magnetized sieve 58 which preferably is less strongly magnetized than the foil.

As illustrated in FIG. 17, it is also possible according to the present invention by means of a permanent, latent magnetic image to produce a durable relief printing form. A highly coercive layer 68 or double layer **68*a* and 68*b* which has been magnetized in accordance with an original image so as to form a latent magnetic image therein is covered with an even layer of a transferable material, for instance soft iron powder. The transfer is carried out by means of the weakly magnetized roller 69 which is supplied with iron powder from shute 71 so that an even layer of iron powder will be formed on roller 69. At the premagnetized portions of magnetic layer 68, i.e., at the portions which form the magnetic image, the layer of iron powder will transfer to magnetic layer 68 and will form thereon a raised relief image corresponding to the latent magnetic image. This relief image which has a high acceptability for ink can now be inked with any desired relief printing ink by means of supply roller 72. In order to avoid displacement or sliding of the relief image, it is advantageous to provide the surface of magnetic layer 68 with grooves 68*c*** or the like.

In cases where the magnetic powder is to serve directly and without admixtures as the image forming material, for instance in accordance with FIGS. 4, 10 and 11, the powder which possesses the magnetic properties according to FIG. 1 should be ground as fine as possible in order to have a good adherence to the carrier sheet, for instance a paper surface on which the image is to be printed. Very fine grain sizes of the magnetic powder are obtained by wet grinding for between about 20 and 40 hours of precominuted ferrite particles. It may be pointed out that the term "mixed ferrite" as used herein does not denote a mixture of several ferrites, but a ferrite which contrary to a simple ferrite contains in addition to iron not only one metal oxide but several metal oxides, for instance like the nickel-zinc and manganese-zinc ferrite according to FIG. 1.

In order to produce a magnetic powder which may be adhered to the copy sheet by heating, as for instance described in connection with FIG. 11, the following method may be followed:

Twenty-five parts by weight of colophony are stirred in liquid condition with 100 parts by weight of a ferrite powder such as $Ni_{0.3}Zn_{0.7}Fe_2O_4$ shown in FIG. 1, and 1 part by weight of channel black or lamp black. After cooling, the mass is ground and screened. A deep black magnetic ink powder is obtained wherein the individual particles are covered by a coating which softens at 80° C. and melts at 100° C. and thereby draws the pigment particles into the surface of the carrier sheet.

A printing ink which is suitable for the magnetic printing process described in connection with FIG. 12 may be produced in the following manner:

10 grams of Multilith offset printing ink 93 935 are diluted with 2 grams offset thinner DO 1094/A.B. of the firm Dick and with either 1 gram of "Triumph" printing ink paste addition or colorless printing ink made by the firm Dr. Wachtel & Co., Chemische Fabrik, Langenberg, Rheinland. The above mixture is intimately mixed with 20 grams ferrite powder 1500 N4 of the firm Siemens. The particle size of the ferrite powder is to be less than 5 microns in order to obtain a sufficiently fine printing ink which will firmly adhere to paper. This fineness can also be achieved in an impeller breaker or by wet grinding in a ball mill.

The diluting agents and additional paste serve for balancing the thickening effect of the magnetic pigments.

It is, of course, also possible to produce a magnetic printing ink which is suitable for the method of the present invention from the conventional materials of an offset printing ink. Thereby, the magnetic pigment is bound generally in varnish-like binders containing resinous and oily constituents. Upon contacting the copy sheet, the constituents of the binder separate into their component parts. The mineral oil constituent of the printing ink is immediately absorbed by the fiber structure, the fillers or the coating of the thus printed paper. The resinous constituents are thereby transformed into an immediately non-smearable gelatinous form and adhere well to the paper. Known varnish combinations which quickly penetrate the paper are polymerized linseed oil and a resinous oil produced from mineral oil, or mineral oil combined with synthetic resins or rubber.

Such a magnetic printing ink which contains about between 50–75% by weight of highly permeable magnetic pigment particles can be transferred in an inhomogenous magnetic field which has a maximum field strength of about 500 oersteds across an air gap of between about 0.5 and 1 mm. formed between two rollers. The field strength required for such transfer across an air gap will be reduced, in known manner, by about the square of any reduction of the width of the air gap. It is possible to operate with a minimum field strength when transfer roller and printing form are in direct contact with each other so that direct ink transfer, due to such contact, would also be possible at the non-magnetic portions, if in the manner of offset or flat printing such transfer at the non-magnetic portions is prevented by moistening of the printing form.

Since the highly permeable magnetic pigments do not always possess sufficient color strength, it is frequently advantageous to add thereto a certain percentage of conventional inorganic or organic pigments, for instance, channel black. This has been done in the example above by the addition of the Multilith printing ink which contains such black pigments.

It is, of course, also possible to apply in conventional manner, lacquer to the pigments in order to prevent undesirable spreading in the paper, and the consistency of the ink can be adjusted to the respective printing process in conventional manner by the addition of appropriate diluting or thickening agents.

A layer of variable magnetic resistance corresponding to layer 1 of FIG. 2 can be obtained by mixing 50% of a pourable polyester resin, such as Leguval made by Bayer, with 45% by volume of ferrite powder, such as 1500 N4 made by Siemens, and 5% by volume of a hardener (peroxide), and by pouring the mixture onto a proper support, for instance cylinder 44 of FIG. 13. A hard layer is formed thereby having a mean permeability in cold condition of about $\mu=15$ and in hot condition, i.e. above the Curie point of the ferrite powder, of about $\mu=1$.

In the same manner, however by using 50% by volume of Bayer S12 powder, it is possible ot produce a permanently magnetizable layer corresponding to layer 7 of FIG. 5. The particle size of the powder depends in both cases on the desired degree of optical resolving power of the copy layer. Generally, the particle size may average about 10 microns.

It will be understood that each of the elements descvribed above, or two or more together, may also find a useful application in other types of magnetic image forming devices, differing from the types described above.

While the invention has been illustrated and described as embodied in a magnetic image forming device utilizing the temperature variable permeability of certain materials, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Method of forming an image in a magnetizable ink layer, comprising the steps of forming on a surface a layer consisting essentially of a magnetizable ink having within a given working temperature range a temperature-dependent magnetic permeability; selectively heating said layer of magnetizable ink within said given temperature range according to a predetermined pattern and in such a manner as to form within said layer a selective pattern of layer portions of varying magnetic permeability corresponding to said predetermined pattern so that the magnetic permeabilities of the portions of said layer which are heated to progressively increasing temperatures will be progressively reduced, thereby forming in said magnetizable ink layer a latent image of high magnetic permeability which is a negative of said predetermined heating pattern; and subjecting said selectively-heated layer to an external magnetic force of such strength and in such a manner to remove only the portions of said magnetic ink layer corresponding to said latent image so as to leave on said surface an ink image.

2. A method as defined in claim 1, and including the steps of arranging adjacent said magnetic ink layer having said negative image of high magnetic permeability, in the indicated sequence, a backing sheet and a source of external magnetic force of such strength and in such a manner that only the portions of said magnetic ink layer corresponding to said latent image will be attracted by the magnetic force emanating from said source of external magnetic force and thereby adhered to said backing sheet interposed between said layer and said source.

3. A method as defined in claim 2, wherein said backing sheet is arranged spaced from said image carrying magnetic ink layer.

4. A method as defined in claim 1, wherein said source of external magnetic force is a magnetic pole.

5. A method as defined in claim 1, wherein said magnetizable ink is a pulverulent ink.

6. A method as defined in claim 5, wherein the particles of said pulverulent ink, are coated with a material having a melting point above said working temperature range.

7. A method as defined in claim 1, wherein said layer consists essentially of a magnetic printing ink comprising magnetic pigment distributed throughout a paper absorbable binder material.

8. A method as defined in claim 1, wherein said selective heating is carried out by reflex in accordance with said predetermined pattern.

References Cited

UNITED STATES PATENTS

| | | | |
|---|---|---|---|
| 2,793,135 | 5/1957 | Sims et al. | 117—17.5 |
| 2,846,333 | 8/1958 | Wilson | 117—17.5 |
| 2,884,348 | 4/1959 | Kulesza | 117—17.5 X |
| 2,943,908 | 7/1960 | Hanna | 117—17.5 X |
| 3,120,806 | 2/1964 | Supernowicz | 117—17.5 X |
| 3,126,492 | 3/1964 | Swoboda | 117—17.5 X |
| 3,161,544 | 12/1964 | Berry | 117—17.5 X |
| 3,250,636 | 5/1966 | Wilferth | 117—17.5 |
| 3,343,174 | 9/1967 | Kornei | 346—74 |

WILLIAM D. MARTIN, Primary Examiner

EDWARD J. CABIC, Assistant Examiner

U.S. Cl. X.R.

117—9, 17.5, 237; 118—637, 639; 250—65; 346—1, 74